United States Patent [19]

Castelein

[11] Patent Number: 4,556,691

[45] Date of Patent: Dec. 3, 1985

[54] THERMOPLASTIC RUBBER CONSISTING OF A MIXTURE OF POLYPROPYLENE, HIGH-IMPACT POLYSTYRENE AND A STYRENE/DIENE BLOCK COPOLYMER

[75] Inventor: Jean Castelein, Mellery, Belgium

[73] Assignee: Montefina S.A., Belgium

[21] Appl. No.: 580,062

[22] Filed: Feb. 14, 1984

Related U.S. Application Data

[63] Continuation of Ser. No. 356,660, Mar. 10, 1982, abandoned.

[30] Foreign Application Priority Data

Mar. 12, 1981 [IT] Italy ................................ 20315 A/81

[51] Int. Cl.⁴ ...................... C08L 53/02; C08L 51/04; C08L 23/12
[52] U.S. Cl. .......................................... 525/71; 525/98
[58] Field of Search .................................... 525/71, 98

[56] References Cited

U.S. PATENT DOCUMENTS

| | | | |
|---|---|---|---|
| 4,197,377 | 4/1980 | Bohm et al. | 525/99 |
| 4,386,187 | 5/1983 | Grancio et al. | 525/96 |

FOREIGN PATENT DOCUMENTS

| | | |
|---|---|---|
| 4685 | 10/1979 | European Pat. Off. |
| 2356694 | 4/1978 | France |

*Primary Examiner*—Carman J. Seccuro

[57] ABSTRACT

Synthetic thermoplastic rubber consisting of a mixture containing from 10% to 45% by weight of polypropylene, from 10% to 45% by weight of high-impact polystyrene and from 30% to 80% by weight of elastomeric copolymer of the linear type, of styrene/diene blocks whose diene is either butadiene or isoprene, having at least three polymeric sequences and a content in styrene lower than 50% by weight.

3 Claims, No Drawings

THERMOPLASTIC RUBBER CONSISTING OF A MIXTURE OF POLYPROPYLENE, HIGH-IMPACT POLYSTYRENE AND A STYRENE/DIENE BLOCK COPOLYMER

This is a continuation, of application Ser. No. 356,660, filed Mar. 10, 1982, now abandoned.

THE PRESENT INVENTION

The present invention concerns a new polymeric material having the properties of thermoplastic rubbers. As is known, the thermoplastic rubbers are materials that possess the elastic properties of vulcanized rubbers and at the same time have the property that they may be turned into shaped articles through thermoforming processes.

The material according to this invention consists of a mixture of crystalline polypropylene, high-impact polystyrene and of a styrene/diene block copolymer.

By the term "crystalline polypropylene" is meant a polymer obtained by means of a stereospecific catalyst, and which has an isotacticity index of at least 80 (determined as a residue of the extraction with boiling n-heptane, expressed in % by weight).

The corresponding quantities of the components in the polymeric mixture are:

polypropylene, 10% to 45% by weight, but preferably from 12% to 30% by weight;
high-impact polystyrene, from 10% to 45% by weight, but preferably from 12% to 30% by weight;
copolymers in styrene/diene blocks, from 30% to 80% by weight, but preferably between 50% and 75% by weight.

The copolymer in styrene/diene blocks is an elastomeric copolymer of the three or more sequences type having an S-(D-S)$_n$ structure wherein n is a whole number, preferably 1, S=styrene, D=diene chosen between butadiene and isoprene, and having a content in styrene lower than 50% by weight.

The copolymers of this type are well known in the Prior Art. They are described, for instance, in U.S. Pat. Nos. 3,149,182 and 3,390,207. In general, they are obtained by means of anionic polymerization in a solvent with a polymerization catalyst of the metal-alkyl type, such as for instance lithium-alkyl.

The mixture of the polymeric components is carried out on equipment of the conventional type.

The polymeric product thus obtained displays a "melt index" that is sufficiently high and is well suited for the trans formation processes such as injection molding and thermo-forming by extrusion.

In the polymeric material according to the invention, the percentage of elastomeric styrene/diene block copolymer as indicated above assumes an essential and critical content. As a matter of fact, it has been found that a higher content of the order of 90% by weight, annuls the thermoplastic properties of the product which is thus no more susceptible to be formed under heat in the plastic state. On the other hand, with a content below the limit of 30%, for instance 17.5%, of the block copolymer of the styrene-butadiene-styrene type the elastomeric properties are much reduced and the elastic recovery is at a minimum.

This is evidenced, amongst others, by the high elongation at break found in the above said material together with a poor impact resistance (125 J/mt at +23° C. and 79 at −18° C.).

EXAMPLE

Mixtures were prepared starting from polypropylene (PPH 7060 produced by Montefina), high-impact polystyrene (Cosden 615 produced by Montefina) and a styrene/butadiene block copolymer "Cariflex TR 1102" made by Shell Chemicals and having a styrene/butadiene ratio of 28:72 by weight and a "melt index" of 6 g/10 min. and a Shore A hardness (30 seconds) of 70. The starting materials, in the form of pellets, were mixed together in a revolving-arms mixer. The mixture thus obtained was thereupon treated in a screw mixer-granulator in order to obtain a pelleted product.

The compositions and the corresponding characteristics have been recorded on Tables Nos. 1 and 2.

TABLE 1

| Physical Properties: | Unit of measure | Method | Test 1 | Test 2 | Test 3 |
|---|---|---|---|---|---|
| Composition: | | | | | |
| High-impact polystyrene | % | — | 32.5 | 25 | 12.5 |
| Polypropylene | % | — | 32.5 | 25 | 12.5 |
| S—B—S copolymer | % | — | 35 | 50 | 75 |
| Properties under tensile stress | | | | | |
| Resistance to tensile stress | N/mm$^2$ | ASTM D 638 | 15 | 10 | 5 |
| Elongation | % | ASTM D 638 | 180 | 180 | 180 |
| Property to bending | N/mm$^2$ | ASTM D 790 | 7.9 | 16.39 | 7.9 |
| Bending resistance | | | | | |
| Resistance to impact | | | | | |
| Izod (with indent) | | | | | |
| at +23° C. | J/mt | ASTM D 256 | 315 | 385 | (*) |
| at −18° C. | J/mt | ASTM D 256 | 240 | 330 | (*) |
| "Falling dart" | J | Gardner | — | 16 | 15 |
| Melt index (200°/50 M) | g/10 min. | ASTM D 1238 | 12 | 8 | 7 |

(*) does not break.

TABLE 2

Elasticity test with elongation speed of 30 cm/min.; residual stretch after 1 min. of relaxation (1).

| Physical Properties: | Unit of measure | Method | Test 1 | Test 2 | Test 3 |
|---|---|---|---|---|---|
| Composition: | | | | | |
| High-impact polystyrene | % | 32.5 | 25 | 12.5 | — |
| Polypropylene | % | 32.5 | 25 | 12.5 | — |
| S—B—S copolymer | % | 35 | 50 | 75 | 100 |
| Elongation up to 60% | | | | | |
| Tensile stress | N/mm$^2$ | 6 | 4 | 2 | 0.85 |
| Residual stretch (% of initial length) | % | 20 | 8 | 4 | 5 |
| Elongation up to 90% | | | | | |

TABLE 2-continued

| | Elasticity test with elongation speed of 30 cm/min.; residual stretch after 1 min. of relaxation (1). | | | | |
|---|---|---|---|---|---|
| Physical Properties: | Unit of measure | Method | Test 1 | Test 2 | Test 3 |
| Tensile stress | N/mm$^2$ | 7 | 5 | 3 | 1 |
| Residual stretch (% of initial length) | % | 40 | 18 | 6 | 7.5 |

(1) Dynafil Branca dynamometer, type 29.

What is claimed is:

1. A thermoplastic synthetic rubber consisting of a mixture containing from 10 to 45% by weight of crystalline polypropylene, from 10% to 45% by weight of high-impact polystyrene and from 50% to 80% by weight of a styrene/diene block copolymer of the linear type, in which the dienic monomer is either butadiene or isoprene, said block copolymer having a structure of three or more sequences, being represented by the formula S-(D-S)$_n$ wherein n is an integer, wherein S=styrene, D=butadiene or isoprene, said rubber having a styrene content below 50% by weight.

2. A thermoplastic synthetic rubber according to claim 1, characterized in that it contains from 12% to 30% by weight of polypropylene, from 12% to 30% by weight of high-impact polystyrene and from 50% to 75% by weight of a styrene/diene block copolymer.

3. A thermoplastic synthetic rubber according to claim 1, characterized in that, in the formula S-(D-S)$_n$, n is 1.

* * * * *